United States Patent
Black et al.

(10) Patent No.: US 9,006,925 B2
(45) Date of Patent: Apr. 14, 2015

(54) DISTRIBUTION PROTECTION SYSTEM AND METHOD

(75) Inventors: Jason Wayne Black, Clifton Park, NY (US); Harjeet Johal, Glenville, NY (US); Zhenhua Jiang, Schenectady, NY (US); David Joseph Najewicz, Prospect, KY (US)

(73) Assignee: General Electric Company, Niskayuna, NY (US)

( * ) Notice: Subject to any disclaimer, the term of this patent is extended or adjusted under 35 U.S.C. 154(b) by 988 days.

(21) Appl. No.: 13/149,325

(22) Filed: May 31, 2011

(65) Prior Publication Data
US 2012/0310430 A1    Dec. 6, 2012

(51) Int. Cl.
*H02J 3/14* (2006.01)
*G06F 1/28* (2006.01)
*H02H 1/00* (2006.01)
*H02J 3/38* (2006.01)

(52) U.S. Cl.
CPC .............. *H02H 1/0061* (2013.01); *H02J 3/381* (2013.01)

(58) Field of Classification Search
None
See application file for complete search history.

(56) References Cited

U.S. PATENT DOCUMENTS

| | | | |
|---|---|---|---|
| 4,117,537 A * | 9/1978 | Muench | 700/295 |
| 6,810,339 B2 | 10/2004 | Wills | |
| 6,850,074 B2 | 2/2005 | Adams et al. | |
| 7,427,815 B1 | 9/2008 | Ye et al. | |
| 7,773,360 B2 | 8/2010 | O'Leary et al. | |
| 2010/0244563 A1 | 9/2010 | Fleck | |

FOREIGN PATENT DOCUMENTS

WO    2010063816 A1    6/2010

OTHER PUBLICATIONS

M. Baran et al., "Adaptive Over Current Protection for Distribution Feeders with Distributed Generators," Power Systems Conference and Exposition, IEEE PES,vol. 2, |Oct. 10-13, 2004, pp. 715-719.
A. Tsikalakis et al., "On-line storage management to avoid voltage limit violations," International Conference on Probabilistic Methods Applied to Power Systems, Jun. 11-15, 2006, pp. 1-7.
P.N. Vovos et al., Centralized and Distributed Voltage Control: Impact on Distributed Generation Penetration, IEEE Transactions on Power Systems, Feb. 2007, vol. 22, Issue 1, pp. 476-483.
IEEE Standard for Interconnecting Distributed Resources with Electric Power Systems, Jul. 28, 2003, IEEE Std. 1547, pp. 1-16.
S. A. A. Shahriari et al. "Minimizing the Impact of Distributed Generation on Distribution Protection System by Solid State Fault Current Limiter," IEEE Transmission and Distribution Conference and Exposition, Apr. 19-22, 2010, ISBN 978-1-4244-6546-0, pp. 1-7.

* cited by examiner

*Primary Examiner* — Jared Fureman
*Assistant Examiner* — Aqeel Bukhari
(74) *Attorney, Agent, or Firm* — Nitin N. Joshi

(57) ABSTRACT

A protection system for a power distribution system includes a bus voltage sensing unit to measure a bus voltage or a load voltage and a demand response module for estimating available demand resources on the distribution system for a period of interest. A distribution system analyzer is provided in the system for analyzing the bus voltage or the load voltage and system parameters to obtain voltage trip points for the available demand resources. A load control circuit controls the available demand resources based on the voltage trip points.

19 Claims, 8 Drawing Sheets

DISTRIBUTION PROTECTION SYSTEM AND METHOD

BACKGROUND

Embodiments of the invention relate generally to an electric power grid and more specifically to distribution protection system in the power grid.

Distributed generation generates electricity from many small energy sources such as photovoltaic cells and fuel cells. Instead of producing power using remote and large generator units, power is generated using a large number of small distributed generators to meet the local load demand. These small generators are interconnected to the grid at medium or low voltage levels. Solar PV as an example is increasingly being connected at low voltage levels as roof-top installations.

Generally, the distribution network topology, control and protection are designed assuming that power is flowing in one direction; from substation to loads. However, the presence of distributed generation may change both the magnitude and direction of power flow in the distribution network or the distribution system. The variability in distributed generation such as the intermittency in renewable generation causes the system operating conditions to vary frequently. For example, a loss or gain of one or more distributed generators may cause the feeder voltage to fluctuate or even violate the desired range. Without coordination, these changes may trigger the false tripping of protective relays including over-current, over-voltage or under-voltage relays.

In addition, disturbances in the distribution system may affect the operation of distributed generators. For example, IEEE Standard 1547 stipulates that when any voltage of a distributed generator bus is outside a given range, the distributed generator shall cease to energize the feeder (i.e. shut down by tripping offline) within a specified clearing time. The clearing time is the time between the start of a disturbance condition and the ceasing of the distributed generator to energize the feeder. The tripping of one distributed generator may deteriorate the voltage profile further and potentially result in cascading tripping of other distributed generators.

Another issue with connection of distributed generators is that it changes the fault current of the distribution system. In other words, when you connect a distributed generator to the distribution system it will contribute to the fault current based on the power it is generating. This can lead to a failure of protection systems to detect faults when there are high levels of distributed generation. One of the approaches to solve this problem is to adaptively change relay settings in coordination with changes in output power of the distributed generation. However, with this approach, the relay settings may not get updated as fast as the output of the distributed generation changes. A potential problem is that a sudden loss of distributed generator under full load may result in the tripping of the over-current relay when the relay set point is reduced to a very low level. Thus, large scale penetration of distributed generation will reduce the effectiveness of protection schemes either through reducing the detection of faults, of creating false trips in response to the loss of distributed generators.

Therefore, there is a need for an improved protection system and method to address one or more aforementioned issues.

BRIEF DESCRIPTION

In accordance with an embodiment of the present invention, a protection system for a power distribution system is provided. The protection system includes a bus voltage sensing unit for measuring a bus voltage or a load voltage and a demand response module for estimating available demand resources on the distribution system for a period of interest. The protection system further includes a distribution system analyzer for analyzing the bus voltage or the load voltage and system parameters to obtain voltage trip points for the available demand resources and a load control circuit for controlling the available demand resources based on the voltage trip points.

In accordance with another embodiment of the present invention, a method of protection a power distribution system is provided. The method includes estimating available demand resources on the distribution system for a period of interest based on demand response programs. The method also includes establishing voltage trip points for the available demand resources based on bus voltages or load voltages and system parameters. The method further includes controlling the available demand resources based on voltage trip points.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail herein, embodiments of the invention include a protection system and method for a distribution system. The basic principle is to utilize and manage aggregated demand side resources to prevent unnecessary tripping of traditional protection schemes in power distribution systems. This capability can significantly assist in managing distribution systems with high penetration of variable distributed generation, such as a solar power generation system.

Figure 1:
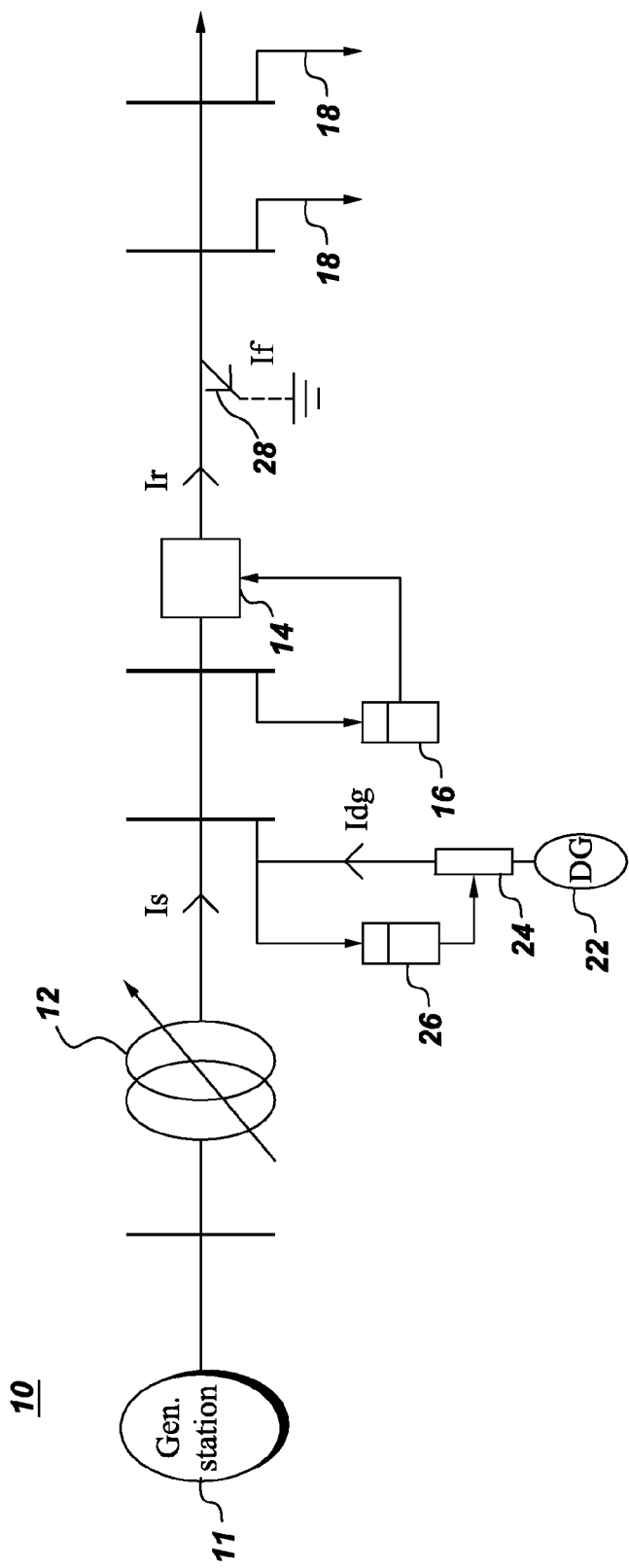
FIG. 1 is a diagrammatical representation of typical radial distribution feeder circuit.

FIG. 1 illustrates a single line diagram of a conventional radial distribution feeder circuit 10. A generating station 11 supplies electric power to transmission and distribution substations 12. The electric power from substation 12 is then fed to various loads 18 through a power circuit breaker or recloser device installed immediately next to substation 12 or in substation 12 but not shown here (such as an element 14) which may be operated by an instantaneous and time overcurrent protection device such as a relay 16 applied for fault detection. As will be appreciated by those skilled in the art, a fault refers to any short circuit condition that occurs between two nodes of an electrical circuit that are at different voltages. The faults that need to be detected may include three-phase, phase-phase, phase-ground, and multiple phases to ground short circuit faults. In certain embodiments, the loading capability of radial distribution feeder circuit 10 may range from 10 to 25 Mega Volts-Amp (MVA) for voltages of 12.5 to 34.5 kilo Volts (kV), for example. In some embodiments, along the radial distribution feeder circuit 10 there may be multiple other overcurrent protection devices which are time coordinated so that the device closest to the fault will trip the fastest. Also the settings of relay 16 are such that for higher fault currents the relay trips the recloser faster compared to the lower fault currents.

A distributed generator (DG) 22 may also be connected to the feeder circuit 10 through a recloser device 24. The recloser device 24 may be operated by an under and over voltage relay 26. If a fault condition occurs at location 28, for example, the relay 16 will sense the fault and will trip the breaker 14. When the distributed generator 22 is connected to the circuit 10, the fault current at location 28 will increase compared to when the distributed generator 22 is not present. The following equations describe this problem: In absence of DG connection:

$$If = Is = Ir1 \quad (1)$$

Where If is fault current, Is is the current supplied by substation 12 in absence of DG 22 and In is the current sensed by the relay 16. As discussed earlier, when DG 22 is connected to the circuit 10, the fault current will increase because of the contribution from DG 22 and can be shown as $$If = Is + Idg = Ir2 \quad (2)$$

Where Idg is the current supplied by DG 22 in absence of the substation power. Further it should be noted the sum Is+Idg is a vector sum i.e., all above terms are complex numbers or vector representations. Thus, it can be seen that the relay current Ir2 in the presence of DG 22 is higher than the relay current Ir1 in the absence of DG 22. So in such cases the settings of the overcurrent relay 16 need to be updated. For example, if the relay 16 was set to operate at a current value of 1.5 pu in absence of DG 22, then the same may need to be updated to 2 pu in the presence of DG 22. However, since the power output from DG is fluctuating, there may be a substantial delay in updating the relay settings accurately. In certain cases, this may result in the tripping of recloser 14 even for momentary faults.

It should be noted that although a DG will quickly adjust to fault conditions, some faults may cause the DG to disconnect from the feeder. If the location of the fault is close enough to the DG, this will cause the DG bus voltage to drop below acceptable limits and this will then trigger the voltage relay 26 to trip recloser 24. The requirements for speed and voltage values of the voltage relay 26 are stated in the IEEE standards for Interconnecting Distributed Resources with Electric Power Systems.

Figure 2:
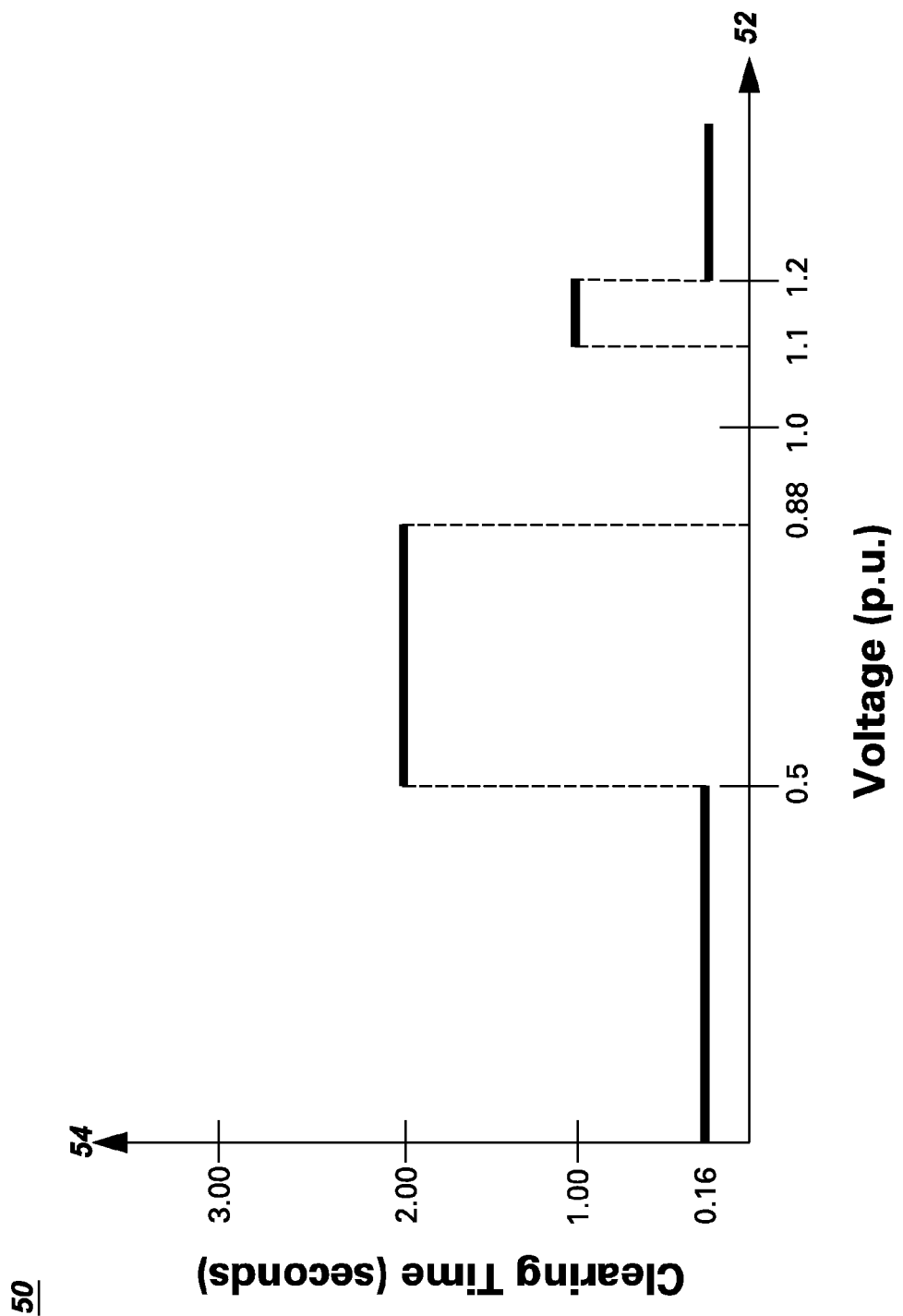
FIG. 2 is a graphical representation of IEEE standard 1547-2003 for interconnecting distributed resources with electric power system.

FIG. 2 shows a plot 50 of IEEE Standard 1547-2003 for interconnecting distributed resources with electric power systems. In plot 50, the horizontal Axis 52 represents voltage (in per unit) at a bus or node on the feeder where a DG is connected and the vertical axis 54 represents clearing time in seconds. The clearing time is the time between the start of an abnormal condition such as a fault and the point at which the DG ceases to energize the feeder. As can be seen from plot 50, when the bus voltage is below 0.5 pu, or above 1.2 pu, the DG should be disconnected from the feeder within 0.16 seconds. Whereas the DG should trip within 2 seconds if the bus voltage is between 0.5 and 0.88 p.u. Similarly, the DG should trip within 1 second when the bus voltage is between 1.1 to 1.2 pu. Also it can be seen that the bus voltage from 0.88 to 1.1 pu represents an acceptable range whereby the DG need not disconnect from the grid during this time. Accordingly, the status of the DG during a fault (i.e., whether it should be connected to the feeder or not) will be determined via the voltage protection relay. However, the bus voltage may fluctuate because of temporary high-impedance faults or faults on a neighboring feeder or even because of significantly higher penetration of power from DGs. Thus, DGs may trip unnecessarily even though there is no fault. The loss of one DG may cause another distributed generator to trip and further trip other DGs without proper mitigation actions. In other words, rapid variations or disturbances in distributed generation or the grid may sometimes result in unnecessary tripping of protective relays for both distributed generators and feeders. These false trips are due mainly to variations in voltage and current that result from rapid changes in power flows.

Figure 3:
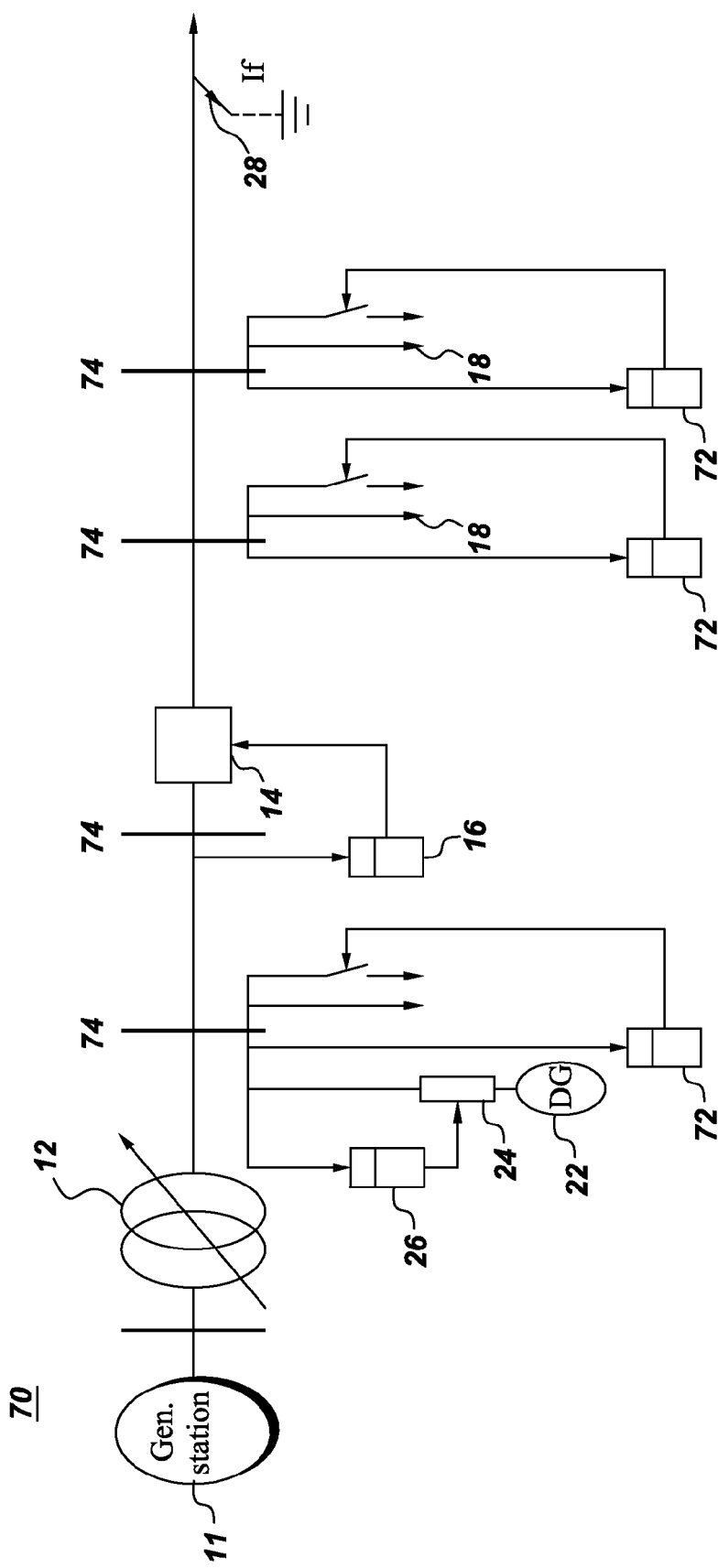
FIG. 3 is a diagrammatical representation of a distribution system in accordance with an embodiment of the present invention.

FIG. 3 shows a distribution system 70 in accordance with an embodiment of the present invention. Distribution system 70 includes multiple protection systems 72. Each protection system 72 determines the voltage at a bus 74 to which it is connected and utilizes demand response in controlling the bus voltages during abnormal conditions by switching on or off the available demand resources or loads. As discussed earlier, the abnormal conditions may include faults and voltage variations beyond the allowable limits as shown in FIG. 2. It should be noted that the protection system 72 may also be called a virtual relay since its function is similar to a voltage relay. In one embodiment, protection system 72 may be implemented in a centralized manner as a single controller for all loads on a single bus. For example, FIG. 3 shows a single controller or a single protection system 72 for a single bus. The arrangement is then repeated for all buses 74. In another embodiment, the protection system 72 may be implemented in a distributed manner as a single controller for a single load on a particular bus. Other embodiments such as multiple protection systems for multiple subsets of loads are also within the scope of this invention.

As an example, to implement protection system 72 in a distributed way, each demand resource or load is given local voltage set points to turn on or off in response to an over or under voltage condition respectively. Thus, the responsive demand resources are controlled by sensing the local voltages (i.e., voltages at the point of demand resources) and comparing them with predetermined time-delayed voltage set points. In other words, if the local voltage exceeds a predetermined value for a predetermined time then the responsive demand resources turns off. Further, the demand resources are set so as to trip faster than existing voltage relays in order to return the distribution system to expected operational profiles in the case of non-fault disturbances. The protection system 72 can respond to the loss of one distributed generator due to minor disturbances without disrupting the feeder operation, whereas traditional protective relays (e.g., 16) would otherwise trip the circuit breakers under real faults despite of the actions of the protection system 72. This method only reduces outages caused by false trips of existing protection relays. Protection system 70 also prevents unnecessary feeder interruptions when feeder over-current relay settings are not updated fast enough while allowing tighter relay settings to protect against high impedance faults.

Figure 4:
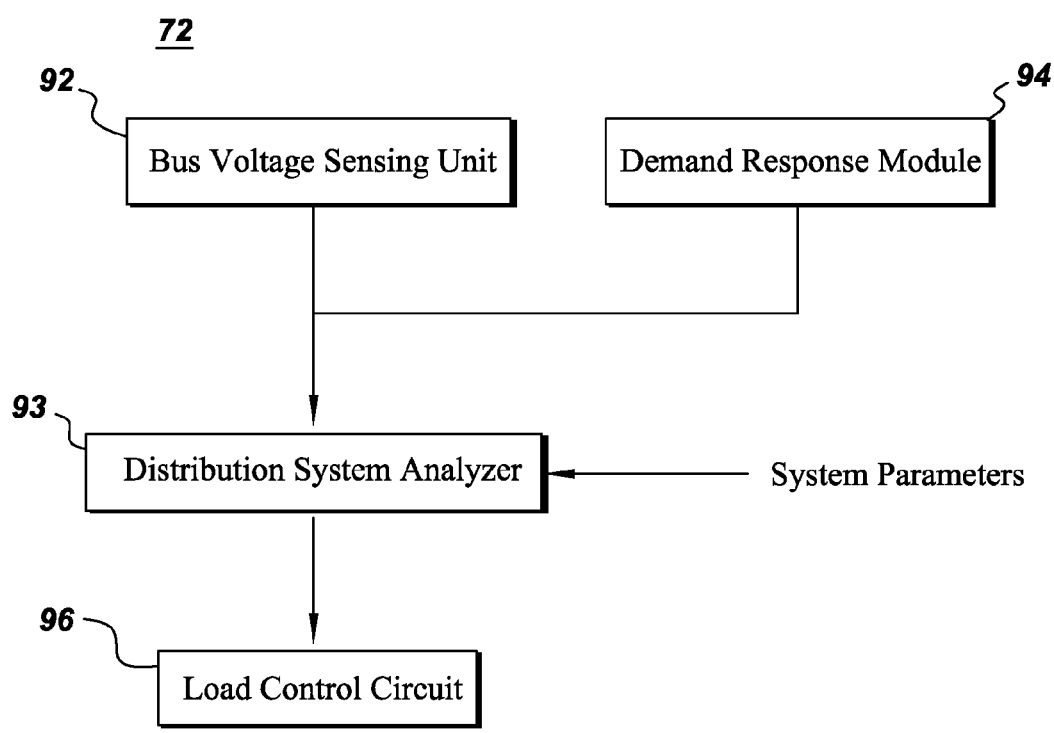
FIG. 4 is a block diagram of a protection system in accordance with an embodiment of the present invention.

FIG. 4 shows a block diagram of a protection system 72 in accordance with an embodiment of the present invention. Protection system 72 includes a bus voltage sensing unit 92, a distribution system analyzer 93, a demand response module 94, and a load control circuit 96. It should be noted that any of the blocks described herein (e.g., 92, 93, 94, and 96), may be a software, or a hardware, or a firmware, or any combination of these, or any system, process, or functionality that performs or facilitates the processes described herein. Bus voltage sensing unit 92 measures a bus voltage and provides it to the distribution system analyzer 93. In one embodiment, the bus voltage sensing unit 92 may be voltmeter or a potential transformer (PT) with its higher voltage side connected to a bus (e.g., 74 of FIG. 3) on the feeder and a voltmeter connected to its lower voltage side utilized for measuring a proportionate voltage on the bus. In another embodiment, the bus voltage sensing unit 92 may be a processor that executes a load flow algorithm that provides voltage information on various buses. Demand response module 94 estimates demand response resources or events available in the distribution system at a given time and then provides that information to distribution system analyzer 93. As will be described in detail in following paragraphs, demand response resources refer to an electrical load of consumers who agree to shed their load in certain cases in exchange for some monetary benefits. The distribution system analyzer 93 then utilizes available demand response resources to alleviate false relay tripping.

In general, demand response refers to mechanisms used to encourage/induce utility consumers to curtail or shift their individual demand in order to reduce aggregate utility demand during particular time periods. For example, in the present embodiment, electric utilities employ demand response events when the bus voltage violates a prescribed range in order to alleviate a power imbalance and to avoid unnecessary DG relay tripping. Demand response programs offered by utilities typically offer customers incentives for agreeing to reduce their demand during certain time periods.

Demand response programs such as critical peak pricing (CPP), Variable Peak Pricing (VPP), Direct Load Control (DLC), and other various incentive programs are examples of programs wherein a utility specifies contractual obligations on when, how often, and the duration of a demand response event for a participating customer. For example, a contract may specify that the utility can invoke up to 15 events per year, where each event will occur between the hours of 12 pm and 6 pm for up to a maximum of 60 total hours per year.

Distribution system analyzer 93 analyzes the bus voltage value determined by the bus voltage sensing unit 92 as well as other system parameters. Such system parameters may include voltage regulator information, capacitor bank information, adaptive relay settings and overall system operating conditions. Distribution system analyzer 93 further determines the circumstances under which false relay trips of distributed generation due to IEEE 1547 specifications might occur. Distribution system analyzer 93 then establishes voltage trip points for each of the participating load resources identified by demand response module 94 for that time. The voltage trip points are voltage values associated with respective clearing times that determines on and off times for the available demand resources. Thus, if the bus voltage exceeds the set points for the specified clearing time, the load control circuit 96 will switch on or off part or all of the responsive load. The load control circuit 96 can return the affected load to normal operation once the voltage returns to the acceptable range.

One of the main criterions for distribution system analyzer 93 in establishing voltage trip points for load resources is that the action of switching off or switching on the load should be faster than the existing distribution system voltage or current relays (26 or 16 of FIG. 3). Table 1 shows a comparison of clearing time for DG relay tripping as per IEEE 1547 and clearing time for demand response in accordance with an embodiment of the present invention,

TABLE 1

Clearing Time (CT) under different voltage levels

| Voltage Range (per unit) | Clearing time for relay tripping (seconds) | Clearing time for demand response (seconds) |
| --- | --- | --- |
| 0 < v ≤ 0.50 | 0.16 | 0.12 |
| 0.50 < v ≤ 0.88 | 2 | 1.6 |
| 0.88 < v ≤ 0.92 | NA | 3 |
| 0.92 < v < 1.05 | NA | NA |
| 1.05 ≤ v < 1.10 | NA | 3 |
| 1.10 ≤ v < 1.20 | 1 | 0.8 |
| 1.20 ≤ v | 0.16 | 0.12 |

As can be seen from the table, for bus voltages between 0 to 0.5 pu and beyond 1.2 pu, the relay will trip the respective recloser or circuit breaker in 0.16 seconds. However, the demand response event needs to occur even before 0.16 seconds and hence is set to operate within 0.12 seconds. Similarly, for the voltage between 0.5 pu to 0.88 pu, the relay will trip the recloser within 2 seconds, however, the demand response will occur in just 1.6 seconds. Voltages between 0.92 pu and 1.05 pu are considered normal and neither relay nor demand response is activated. It should be noted that the values of clearing time for demand response in table 1 are mere exemplary and in other embodiments the distribution system analyzer might use other values based on overall system conditions with the objective of minimizing the disruption to the consumers and as well as protecting distributed generators.

Another criterion for distribution system analyzer 93 in establishing voltage trip points for load resources is the location of demand response resource. In one embodiment, demand resources that are close to distributed generators may have the greatest impact on improving the voltage profile of the system in response to a loss of that particular distributed generator. Thus, the responsive demand resources are activated based upon local setpoints and clearing times which may vary according to circuit characteristics or voltage profiles. It may also happen that multiple demand response resources may be required to participate in the protection scheme. For example, if the demand resources at a particular DG location are not sufficient, the resources at adjacent nodes may come into play, since there may be some correlation between the voltages at adjacent nodes. The set points for a particular demand resource can be adjusted both to maximize the impact for protection, and to also equitably or economically distribute the number of times a particular load is called upon to respond. It may happen, as an example, that the demand resource at the end of the line would get picked all the time because it has the greatest impact on improvement on voltage profiles. Adjusting set points or random selection of available demand resources may be an option to solve this problem.

Yet another criterion for distribution system analyzer 93 in establishing voltage set points for load resources is the amount of responsive load. The distribution system analyzer 93 needs to determine the amount of responsive load necessary for given conditions. For example, insufficient load reductions will not restore voltage to levels that will prevent tripping of distributed generators. On the other hand, excessive load reductions will result in unnecessary disruption of the service to some customers. In one embodiment, a theoretical analysis of the sensitivity of node voltage changes to power flow variations may be conducted to determine how much load reduction is appropriate. In another embodiment, a sampling approach in a distributed way is utilized to phase in load reductions as needed. Typically, the household load is not continuous. When an appliance or a piece of electronic equipment is turned on or off, the load consumption changes discretely. So in the sampling approach, parts of the household loads are shed selectively in an increasing order instead of shedding all loads at once. The timing of individual pieces of load can be slightly different, and neighboring households may have random timing. This allows appropriate amount of load reduction to return voltage to desired levels.

Figure 5:
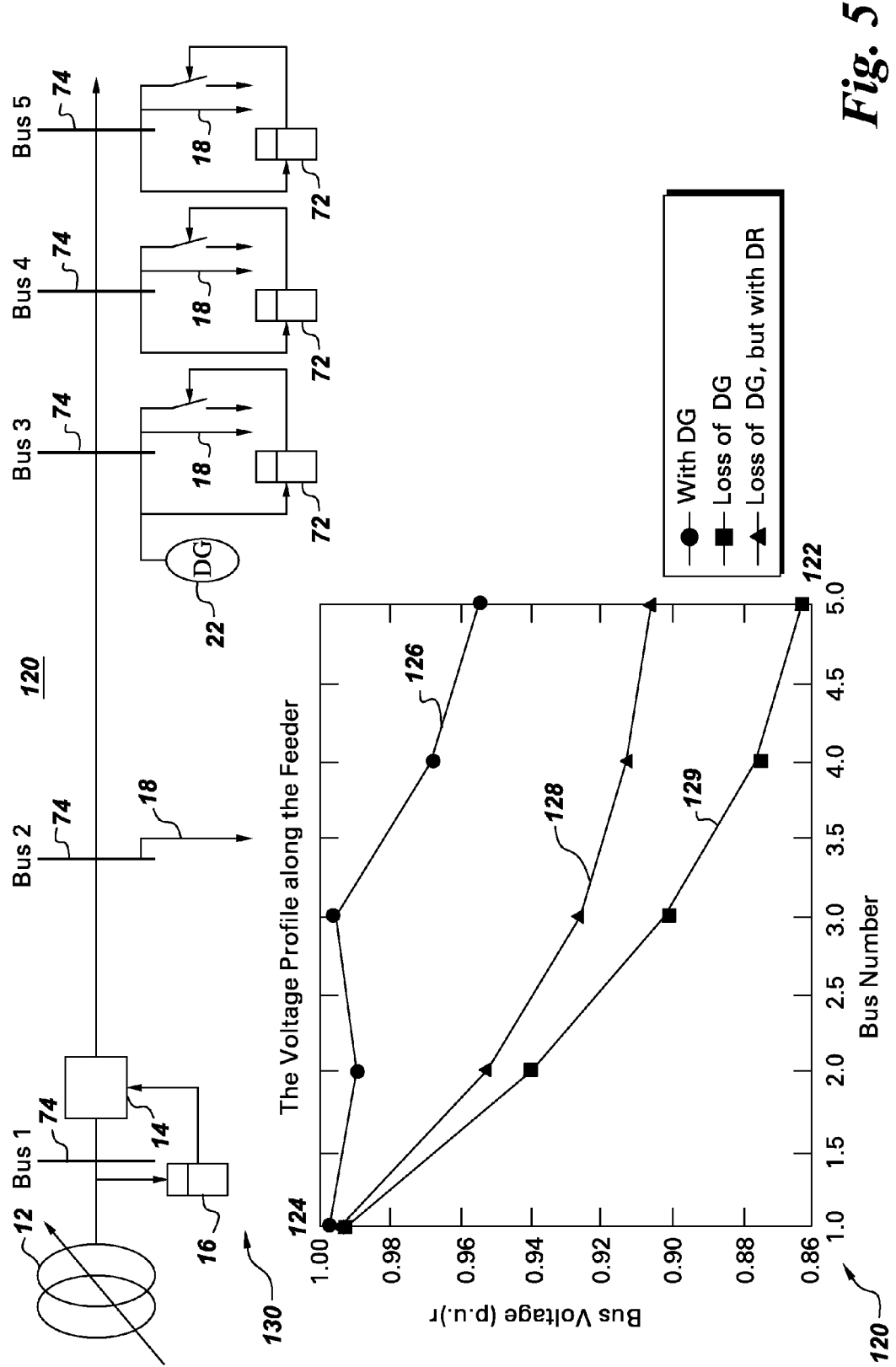
FIG. 5 is a graphical representation of voltage profile along a feeder on distribution system.

FIG. 5 shows voltage profile plot 120 for an example distribution system 130. The distribution system 130 is a five bus system with a DG 22 on bus 3. Protection systems 72 are located on each of the buses 3, 4, and 5. Plot 120 shows a voltage profile along the feeder on the distribution system 130. Horizontal axis 122 on plot 120 represents bus number and vertical axis 124 on plot 120 represents bus voltage in pu. Plot 120 shows three different curves 126, 128, and 129. Curve 126 is a voltage profile when DG 22 is supplying power to distribution system 130. Curve 126 shows that voltage on bus 1 is approximately 1 pu and because of the voltage drop on feeder between bus 1 and bus 2 the voltage on bus 2 falls to around 0.99 pu. At bus 3, since the DG is connected, the voltage goes up to around 1 pu whereas on bus 4 and 5 the voltage drops to around 0.97 and 0.96 pu respectively.

Curve 129 shows voltages on various buses in absence of protection system 72 and when DG 22 is disconnected from distribution system 130. Since there is no DG on bus 3, the voltages from bus 1 to bus 5 keep dropping from 1 pu to approximately 0.86 pu. However, when protection system 72 is employed the loads on distribution system 130 are controlled such that half of the load on bus 4 and bus 5 are shed or turned off. This results in improvement in voltages profile 128 on buses 1 to 5 with voltages now varying from 1 pu to 0.91 pu instead of 1 pu to 0.86 pu as in curve 129. The improvement in voltage profile occurs because when the loads are reduced the current in the feeder reduces which reduces voltage drop across the feeder and increases bus voltages.

Figure 6:
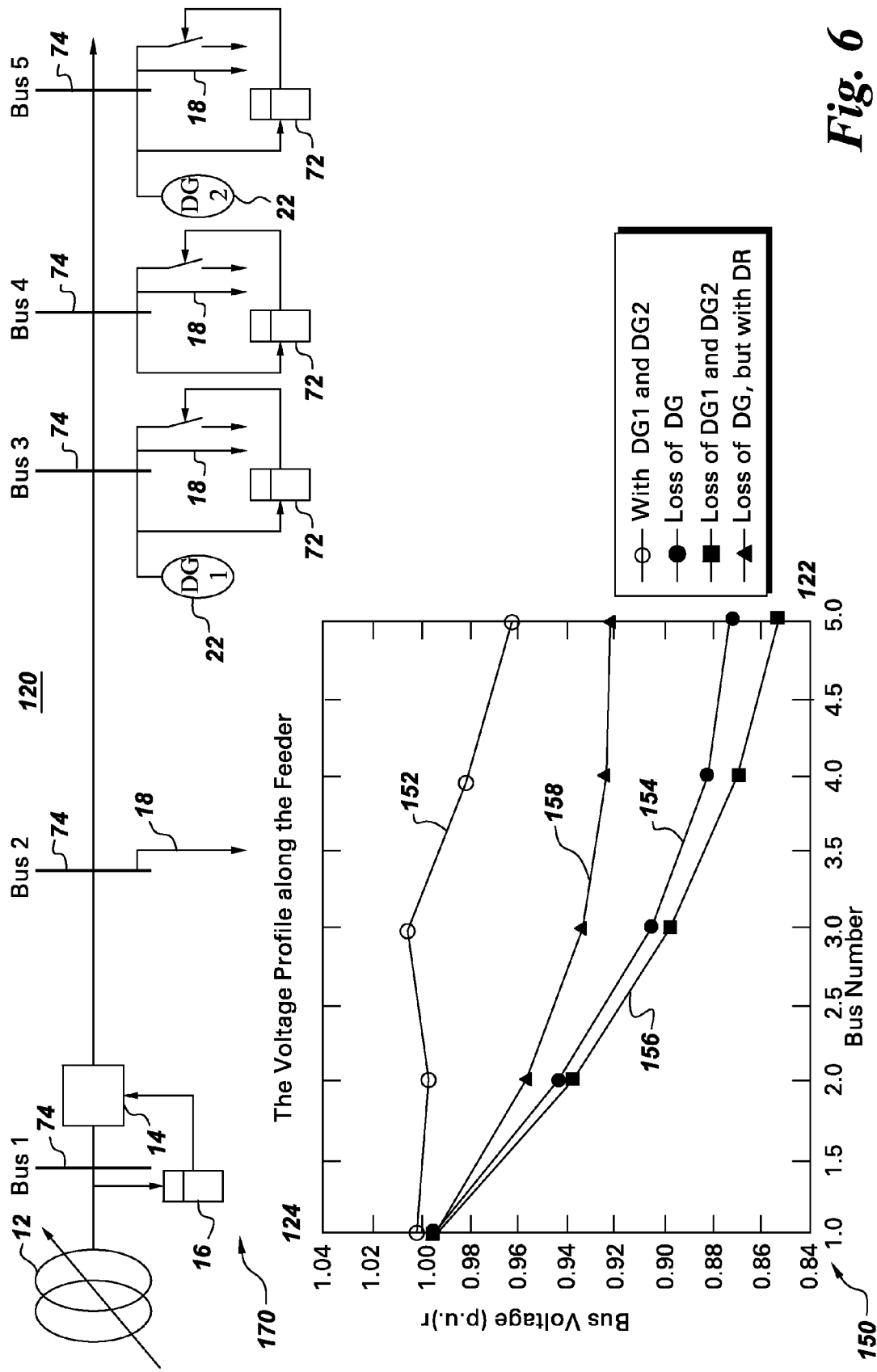
FIG. 6 is another graphical representation of voltage profile along a feeder on a distribution system.

FIG. 6 shows another voltage profile plot 150 for an example distribution system 170. The distribution system 170 is a five bus system with a first DG 22 having a higher power rating on bus 3 and another DG 22 with a lower power rating on bus 5. Plot 150 shows four different curves 152, 154, 156 and 158. Curve 152 is a voltage profile when both DGs 22 are supplying power to distribution system 170. Curve 154 represents a voltage profile when first DG 22 is disconnected from the system 170. The first DG may be disconnected because of several reasons. For example for a wind generation plant there may not be sufficient wind in the particular area. It can be seen that with the first DG, disconnection voltage on bus 5 drops to almost 0.87 pu. This voltage value exceeds the prescribed limit by IEEE standards and will result in tripping of the second DG 22 which further pulls down the overall system voltages as shown in curve 156. However, when the protection system 72 is employed into system 170, voltage at bus 5 increases above 0.92 pu as shown in curve 158 which ensures that second DG 22 need not be disconnected from the system.

Figure 7:
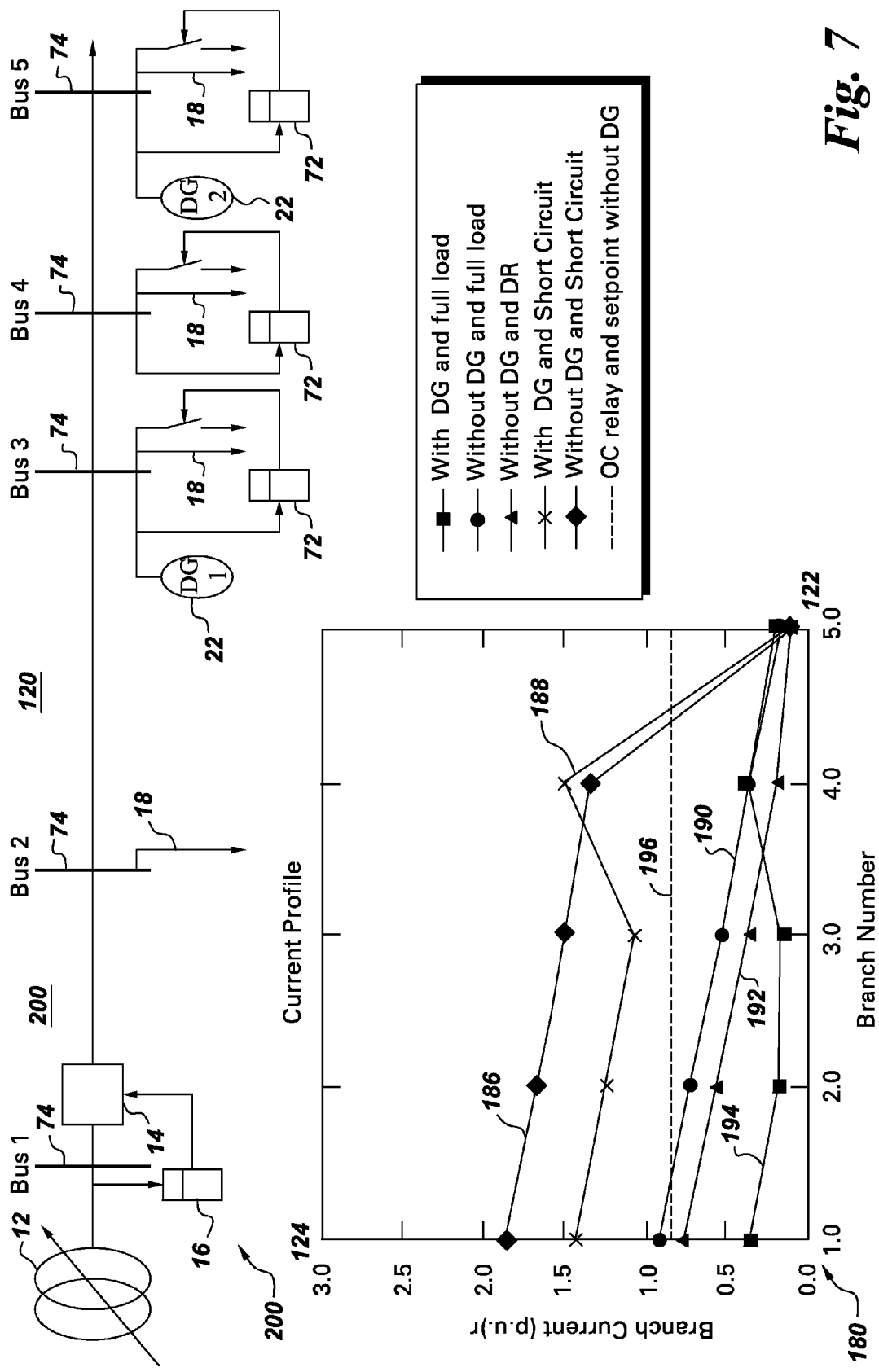
FIG. 7 is a graphical representation of a current profile across various branches on a distribution system.

FIG. 7 shows a current profile plot 180 for an example distribution system 200. The distribution system 200 is similar to distribution system 170 of FIG. 6 with an adaptive overcurrent relay16. In the illustrated embodiment, adaptive overcurrent relay settings are such that in absence of any DG the overcurrent relay1 6 trips recloser 14 within 0.2 seconds when the overcurrent relay senses the current of 2 pu. The adaptive overcurrent relay settings are changed to 0.85 pu in presence of DGs. Plot 180 shows 6 current profile curves 186, 188, 190, 192, 194 and 196 across various branches. Horizontal axis 182 of plot 180 represents branch number whereas vertical axis 184 represents current supplied from that particular branch. Curve 196 merely represents a setpoint of adaptive overcurrent relay 16 in absence of DG, where the setpoint refers to a current value at which the relay should trip. Curve 194 shows a current profile when the first DG 22 is connected into the system 200 with full load. When the first DG 22 is disconnected with full load still being present, the current from branch 1 increases to around 0.9 pu as shown in curve 190. Since this current exceeds the setpoint of adaptive overcurrent relay 16, relay 16 trips the circuit breaker or recloser 14. Thus, disconnection of one DG from the distribution system 200 results in disconnection of the complete circuit 200 from a power grid. However, when protection system 72 is employed, the protection system disconnects some of the loads on bus 4 and 5 improving the current profile along the branches as shown in curve 192. Now since the current from branch 1 (0.8 pu) is lower than adaptive relay setting (0.85 pu) it doesn't trip the circuit breaker 14 thereby keeping the circuit 200 energized. Thus, protection system 72 prevents complete breakdown of system 200.

Further, curve 186 shows a current profile when there is a short circuit fault on bus 4 in the absence of DGs, whereas curve 188 shows similar current profile in the presence of DGs. As can be seen from curve 188, when there is fault in presence of DGs, the fault current at bus 1 goes to around 1.4 pu exceeding the adaptive relay settings of 0.85 pu and thus tripping recloser 14 and protecting circuit 200. Thus, protection system 72 does not affect overcurrent relay operation in the presence of faults.

Figure 8:
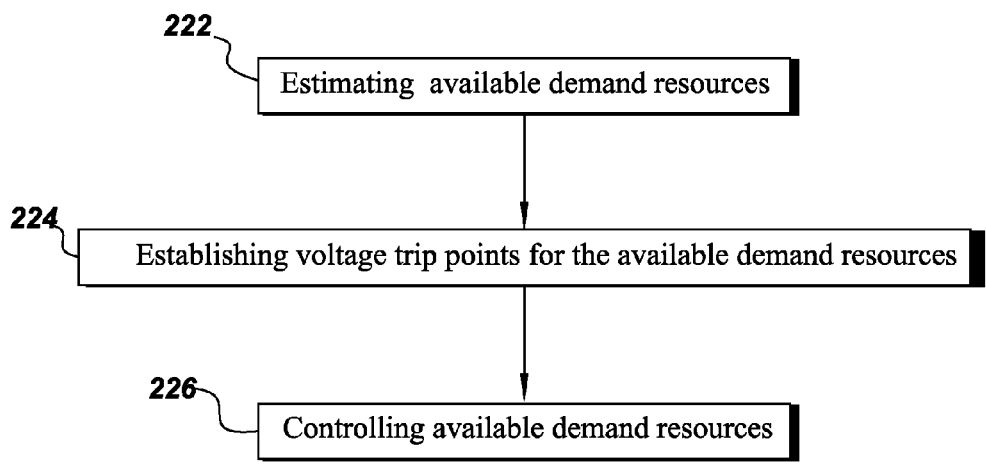
FIG. 8 is a flowchart representing a method of protecting a power distribution system in accordance with an embodiment of the present invention.

FIG. 8 shows a method 220 of protecting a power distribution system in accordance with an embodiment of the present invention. At step 22 of method 220 available demand resources for the demand response are determined As discussed earlier, the demand response programs include critical peak pricing (CPP), Variable Peak Pricing (VPP), Direct Load Control (DLC), and other various incentive programs. In step 224, voltage trip points are established for the available demand resources. In one embodiment, the voltage trip points may be determined based on bus voltages when the control is centralized or based on local load voltages when the control is distributed. Other factors that help in identifying voltage trip points include system parameters such as voltage regulator information, capacitor bank information, and adaptive relay settings. In step 226, the available demand resources are controlled as per the voltage trip points. Controlling available demand resources may include switching on or switching off part or all of the loads either at once or in steps.

One of the advantages of the proposed system is that it allows for tighter settings for protection relays in the distribution system to detect high impedance faults. High impedance faults are those which have lesser fault currents due to high impedance such as tree or sod between the power line and the ground. Generally, the protection relays are unable to distinguish between these high impedance faults and common load imbalances. In one embodiment of the present invention, this problem is solved by reducing the settings of the protection relay. For example, reducing the current settings of the relay from 1.5 pu to 1.3 pu gives a detection capability of high impedance fault of 1.3 pu. This is possible because the contribution of the DG to the fault can now be diverted to a certain amount of load.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A protection system for a power distribution system comprising:
   a bus voltage sensing unit configured to measure a bus voltage or a load voltage;
   a demand response module including a combination of software and hardware elements for estimating available demand resources on the distribution system for a period of interest;
   a distribution system analyzer coupled to the bus voltage sensing unit and including a combination of software and hardware elements for analyzing the bus voltage or the load voltage and system parameters to obtain voltage trip points for the available demand resources; and
   a load control circuit to control the available demand resources based on the voltage trip points.

2. The protection system of claim 1, wherein the voltage sensing unit comprises a voltmeter or a potential transformer with a voltmeter or a processor that executes a load flow algorithm.

3. The protection system of claim 1, wherein system parameters include voltage regulator information, capacitor bank information, and adaptive relay settings.

4. The protection system of claim 1, wherein voltage trip points are voltage values associated with respective clearing times that determine on and off times for the available demand resources.

5. The protection system of claim 1, wherein controlling the available demand resources comprises switching on or off part or all of the demand resources.

6. The protection system of claim 1, wherein the voltage trip points are set to be faster than relay settings of current and voltage relays of the power distribution system.

7. The protection system of claim 1, wherein the distribution system analyzer obtains voltage trip points based on location of demand resources.

8. The protection system of claim 1, wherein the available demand resources includes demand resources on an adjacent bus.

9. The protection system of claim 1, wherein the distribution system analyzer further determines an amount of available demand resources that need to be utilized.

10. The protection system of claim 9, wherein the distribution system analyzer determines the amount of available demand resources based on sensitivity of bus voltage changes to power flow variations.

11. The protection system of claim 1, wherein the load control circuit sheds parts of the available demand resources selectively in steps.

12. The protection system of claim 1, wherein the distribution system analyzer is implemented in a centralized or a distributed manner.

13. A method of protecting a power distribution system comprising:
   estimating available demand resources on the distribution system for a period of interest based on demand response programs;
   establishing voltage trip points for the available demand resources based on bus voltages or load voltages and system parameters; and
   controlling the available demand resources based on voltage trip points.

14. The method of claim 13, wherein system parameters include voltage regulator information, capacitor bank information, and adaptive relay settings.

15. The method of claim 13, wherein controlling the available demand resources comprises switching on or switching off part or all of the demand resources.

16. The method of claim 13, wherein controlling the available demand resources comprises switching on or switching off parts of the available demand resources selectively in steps.

17. The method of claim 13, wherein the voltage trip points are set to be faster than relay settings of current and voltage relays of the power distribution system.

18. The method of claim 13, wherein estimating available demand resources on the distribution system comprises determining demand resources based on sensitivity of bus voltage changes to power flow variations.

19. The method of claim 13 further comprising establishing relay setting for protection relays of the power distribution system to detect high impedance fault.

* * * * *